United States Patent
Amon

(10) Patent No.: US 9,338,469 B2
(45) Date of Patent: May 10, 2016

(54) METHOD FOR ENCODING SYMBOLS FROM A SEQUENCE OF DIGITIZED IMAGES

(75) Inventor: Peter Amon, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 801 days.

(21) Appl. No.: 13/502,283

(22) PCT Filed: Oct. 13, 2010

(86) PCT No.: PCT/EP2010/065335
§ 371 (c)(1),
(2), (4) Date: Apr. 16, 2012

(87) PCT Pub. No.: WO2011/045339
PCT Pub. Date: Apr. 21, 2011

(65) Prior Publication Data
US 2012/0207213 A1    Aug. 16, 2012

(30) Foreign Application Priority Data

Oct. 15, 2009 (EP) .................................... 09013060
Jan. 19, 2010 (EP) .................................... 10000484

(51) Int. Cl.
*H04B 1/66* (2006.01)
*H04N 7/12* (2006.01)
*H04N 11/02* (2006.01)
*H04N 11/04* (2006.01)
(Continued)

(52) U.S. Cl.
CPC ............. *H04N 19/436* (2014.11); *H04N 19/13* (2014.11); *H04N 19/174* (2014.11)

(58) Field of Classification Search
None
See application file for complete search history.

(56) References Cited

U.S. PATENT DOCUMENTS 5,583,500 A * 12/1996 Allen .................. H03M 7/4006
341/107
6,026,198 A    2/2000 Okada
(Continued)

FOREIGN PATENT DOCUMENTS

CN    1585958    2/2005
CN    1816828    8/2006
(Continued)

OTHER PUBLICATIONS

Li, L., et al.: A hardware architecture of cabac encoding and decoding with dynamic pipeline for h.264/avc. J. Signal Process. Syst., 81-95 (2008).*
(Continued)

*Primary Examiner* — Christopher S Kelley
*Assistant Examiner* — Rebecca Volentine
(74) *Attorney, Agent, or Firm* — Slayden Grubert Beard PLLC

(57) ABSTRACT

Images are divided into image regions. The image regions are processed in encoding cycles such that during an encoding cycle, entropy encoding is carried out in a plurality of parallel encoding branches. In each encoding branch the symbols of an image region are encoded by entropy encoding, which is based on one or more probability models, which take into account the frequencies of symbols occurring in image regions. The probability models are adapted on the basis of the symbols occurring in the image region. A common set of probability models is updated at predetermined time intervals on the basis of frequencies that are adapted in at least one temporally preceding encoding cycle.

19 Claims, 7 Drawing Sheets

(51) Int. Cl.
*H04N 19/436* (2014.01)
*H04N 19/13* (2014.01)
*H04N 19/174* (2014.01)

(56) References Cited

U.S. PATENT DOCUMENTS

| | | | |
|---|---|---|---|
| 7,460,042 | B2 | 12/2008 | Oshikiri et al. |
| 7,982,641 | B1* | 7/2011 | Su et al. .......................... 341/107 |
| 2003/0081850 | A1 | 5/2003 | Karczewicz et al. |
| 2005/0074176 | A1* | 4/2005 | Marpe .................. H04N 19/196 382/239 |
| 2005/0088324 | A1* | 4/2005 | Fuchigami et al. ........... 341/107 |
| 2006/0149801 | A1 | 7/2006 | Kirenko |
| 2007/0097850 | A1* | 5/2007 | Park ....................... H04N 19/61 370/202 |
| 2007/0110153 | A1* | 5/2007 | Cho ..................... H04N 19/176 375/240.12 |
| 2007/0115154 | A1* | 5/2007 | Park .................... H03M 7/4006 341/51 |
| 2008/0240234 | A1* | 10/2008 | Hung et al. .............. 375/240.02 |
| 2009/0079602 | A1* | 3/2009 | Sze et al. ....................... 341/107 |
| 2009/0141806 | A1* | 6/2009 | Marpe et al. ............. 375/240.24 |
| 2009/0225861 | A1* | 9/2009 | Sato et al. ................. 375/240.16 |
| 2009/0245349 | A1* | 10/2009 | Zhao et al. ............... 375/240.03 |
| 2009/0267825 | A1 | 10/2009 | Vetro et al. |
| 2010/0027680 | A1* | 2/2010 | Segall et al. ............. 375/240.24 |
| 2010/0135416 | A1* | 6/2010 | Huang et al. ............. 375/240.24 |
| 2010/0177828 | A1* | 7/2010 | Rubinstein et al. ...... 375/240.26 |
| 2011/0001643 | A1* | 1/2011 | Sze et al. ........................ 341/87 |
| 2012/0099657 | A1 | 4/2012 | Tanaka et al. |

FOREIGN PATENT DOCUMENTS

| | | |
|---|---|---|
| EP | 1482449 | 12/2004 |
| EP | 09013060 | 10/2009 |
| EP | 10000484.5 | 1/2010 |
| EP | 2010/065335 | 10/2010 |
| JP | 9-275349 | 10/1997 |
| JP | 11-46145 | 2/1999 |
| JP | 2007-312427 | 11/2007 |
| JP | 2008-11204 | 1/2008 |
| JP | 2009-268064 | 11/2009 |
| WO | 2009/119888 | 10/2009 |
| WO | 2010/063184 | 6/2010 |
| WO | 2011/004577 | 1/2011 |

OTHER PUBLICATIONS

Greg Conklin, "New Intra Prediction Modes," ITU-Telecommunications Standardization Sector Study Group 16, Question 6, Video Coding Experts Group, Document VCEG-N54, Sep. 24-27, 2001, pp. 1-10.
German language Japanese Office Action for related Japanese Patent Application No. 2012-533619, issued Nov. 15, 2013.
German language Japanese Office Action for related Japanese Patent Application No. 2012-533619, issued Jun. 24, 2013, 5 pages.
Chinese Office Action for related Chinese Patent Application No. 201080046392.5, issued Mar. 5, 2014, 18 pages.
Xun Guo et al., "Ordered Entropy Slices for Parallel CABAC", ITU-Telecommunications Standardization Sector, Study Group 16 Question 6, Video Coding Experts Group (VCEG), 37$^{th}$ Meeting, 2009, VCEG-AK25, pp. 1-8.
Jie Zhao, et al., "New Results using Entropy Slices for Parallel Decoding", ITU-Telecommunications Standardization Sector, Study Group 16 Question 6, Video Coding Experts Group (VCEG), 35$^{th}$ Meeting, 2008, VCEG-AI32, pp. 1-9.
Japanese Office Action mailed Mar. 24, 2014 in corresponding Japanese Application No. 2012-533619.
Xun Guo et al., "Ordered Entropy Slices for Parallel CABAC," ITU-Telecommunications Standardization Sector, Study Group 16 Question 6, Document VCEG-AK25, Filename VCEG-AK25.doc, 37$^{th}$ Meeting: Yokohama, Japan, Apr. 2009, pp. 1-8.
Andrew Segall et al., "Entropy slices for parallel entropy decoding," ITU-Telecommunication Standardization Sector, Study Group 16, Contribution 405, Question 6/16, Apr. 2008, pp. 1-9.
Vivienne Sze et al., "Parallel CABAC," ITU-Telecommunication Standardization Sector, Study Group 16, Contribution 334, Question 6/16, Apr. 2008, pp. 1-10.
Vivienne Sze et al., "Massively Parallel CABAC," ITU-Telecommunications Standardization Sector, Study Group 16, Question 6, Document VCEG-AL21, Filename VCEG-AL21.doc, 38$^{th}$ Meeting: London, UK/Geneva, CH, Jul. 2009, pp. 1-10.
Detlev Marpe et al., "Context-Based Adaptive Binary Arithmetic Coding in the H. 264/AVC Video Compression Standard," IEEE Transactions on Circuits and Systems for Video Technology, vol. 13, No. 7, Jul. 2003, pp. 620-636.
International Search Report for PCT/EP2010/065335, mailed on Dec. 13, 2010.

* cited by examiner

METHOD FOR ENCODING SYMBOLS FROM A SEQUENCE OF DIGITIZED IMAGES

CROSS REFERENCE TO RELATED APPLICATIONS

This is the US National Stage of International Application No. PCT/EP2010/065335 filed on Oct. 13, 2010, which claims priority to European Application Nos. 09013060.0 filed on Oct. 15, 2009 and 10000484.5 filed on Jan. 19, 2010, the contents of which are hereby incorporated by reference.

BACKGROUND

The invention relates to a method for encoding symbols from a sequence of digitized images together with a corresponding decoding method. Over and above this, the invention relates to an encoding device and a decoding device for carrying out respectively the encoding or decoding method.

Video encoding methods are in general carried out in two processing stages. First, the images in the video stream are decorrelated in a suitable way, by prediction and transformation. The result of the decorrelation step is symbols in the form of transformation coefficients, motion vectors, further encoding data and the like. This is often followed by in turn a quantization of the symbols which have been generated, by which the compression efficiency is increased. In a second manipulation process, the symbols which have been generated are subjected to a loss-free entropy encoding, in which the redundancy which still exists in the generated symbols, i.e. their probabilities of occurrence and their mutual statistical dependency, is utilized to generate from the symbols the shortest possible code words, with the shortest possible overall length for the data stream.

From the related art, various methods are known for entropy encoding. In the case of VLC encoding (VLC=Variable Length Coding), each symbol which is generated is mapped bijectively onto a code word. The relationship between a symbol and the corresponding code word is then represented by a code table, such as for example a look-up table.

Another common method of entropy encoding is arithmetic encoding. Unlike VLC encoding, in which a symbol is transformed into a code word, in the case of arithmetic encoding one single code word is generated from several symbols. With arithmetic encoding, the symbols are mapped onto binary numbers, on the basis of their frequencies, so that a binary representation of the successive symbols is obtained.

In general, entropy encoding methods are based on the principle of deriving, from the frequencies of the symbols which occur, one or more probability models on the basis of which short code words are generated, i.e. the code words generated by the entropy encoding are shorter for symbols or symbol sequences which have a high frequency than for symbols or symbol sequences with a lower frequency. In general, entropy encoding methods are context-based, i.e. different types of symbols are distinguished, these representing different items of data. For these different types of symbols, the frequencies of the symbols which occur are processed separately in a specific context, and hence on the basis of a specific probability model. In video encoding methods, a context can if necessary also depend on other criteria, for example the encoding of an image region can depend on the encoding decisions for neighboring image regions in the image. Further, entropy encoding methods are often organized adaptively, i.e. during the encoding, the probability models are appropriately adapted, on the basis of the changing frequencies of the symbols which occur.

In order to increase the encoding speed of entropy encoding methods, various methods are known from the related art. In the H.264/AVC video encoding standard, the images in the video stream are divided up into so-called slices, where each slice represents a part of the image which can be encoded completely independently of the other parts. That is to say, both in the generation of the original symbols and also in the subsequent generation of the code word based on entropy encoding, there are no interdependencies between different slices. Hence, the probability models or contexts, as applicable, are not matched across slices. This leads to a lower compression efficiency.

Also known from the related art is the subdivision of video images into so-called entropy slices (see A. Segall et al., "Entropy slices for parallel entropy decoding," (2008) ("Segall")). Unlike the conventional slices described above, entropy slices permit dependency between the symbols, such as for example, intraprediction. Only the generation of the code words based on the entropy encoding is independent between the individual entropy slices. By the use of entropy slices, the compression efficiency is increased by comparison with conventional slices. This notwithstanding, the disadvantage remains that different statistics are used for the symbols in different entropy slices, which in turn reduces the efficiency of the entropy encoding.

X. Guo, "Ordered Entropy Slices for Parallel CABAC," (2009) ("Guo") describes the concept of so-called ordered entropy slices, which improve the properties of the entropy slices described above. In this case, the formation of a context for the entropy encoding is permitted across multiple entropy slices. The statistical dependencies between entropy slices are thus taken into account, so that the encoding efficiency is improved. Over and above this, the individual macroblocks in the image are not read in line-by-line during the encoding, but in a zigzag pattern. This is clarified in FIGS. 1A to 1C. These figures show different variants, conforming to Guo, of the reading in of macroblocks, where the individual macroblocks are represented by a sequence of rectangles and, for the sake of clarity, only some of them have been labeled with the reference mark MB. FIG. 1A shows line-by-line reading in of the macroblocks, as is indicated by the vertical line L1. In taking into account the context, which requires the neighboring macroblocks on the left hand, the upper left hand, the upper and the upper right hand sides to be available for the encoding of a macroblock, the problem exists with this variant that it is not possible to process several lines of macroblocks in parallel. In contrast to this, the zigzag pattern of macroblock processing, based on the line L2 as shown in FIG. 1B, permits parallel processing of two lines in each case, because the encoding of the first macroblock of the following entropy slice in the third line can start as soon as the fifth macroblock of the first pair of lines has been read in. FIG. 1C shows another variant of a zigzag pattern reading in of macroblocks, which now makes possible the processing of three lines per ordered entropy slice, as shown by the line L3.

A further variant of entropy slices is so-called interleaved entropy slices, which are described in V. Sze et al., "Massively Parallel CABAC," (2009) ("Sze 2009"). In this case, the slices do not represent contiguous lines, but rather the lines of the individual slices are nested within one another. This is again clarified in FIGS. 2A and 2B. In this connection, FIG. 2A shows a subdivision of an image I into two conventional entropy slices SL1 and SL2, where the upper half of the image forms a contiguous slice SL1 with macroblocks MB1 and the lower portion SL2 of the image forms a contiguous slice SL2 with appropriate macroblocks MB2 (shown hatched). Unlike these conventional slices, an example of interleaved entropy slices is shown in FIG. 2B. Here, each slice concerned, SL1' or SL2', is formed by lines of macroblocks which are offset by one line relative to each other. The slice SL1' in FIG. 2B is identified by unshaded macroblocks MB1' and is formed by the first, third, fifth etc. line. On the other hand, the slice SL2' is identified by the hatched macroblocks MB2' and is formed by the second, fourth, sixth etc. line. Interleaved entropy slices permit the formation of contexts across multiple entropy slices. However, no common statistic is generated for the probability model used for entropy encoding.

For the purpose of improving the compression efficiency in video encoding methods, Sze 2009 describes in addition syntax element partitioning. With this, several code words are generated for different groups of syntax elements, such as for example mode data, motion vectors, transformation coefficients. Because the individual groups have different contexts, the context formation is also carried out separately. Because the relative frequencies of the different groups are different, the computing load when using parallel encoding branches for encoding is unbalanced between the individual encoding branches.

The V. Sze et al., "Parallel CABAC," (2008) describes a special variant of an arithmetic encoding, in which two binary symbols are processed in parallel during the encoding. In this way it is possible to encode four states in one encoding cycle, instead of two. However, with this type of encoding the context formation is complex, and more operations are required per encoding cycle.

SUMMARY

It is one possible object to improve the entropy encoding of symbols in a sequence of digitized images in such a way as to enable parallel processing of several image areas combined with a higher encoding efficiency.

The inventor proposed a method for encoding symbols from a sequence of digitized images in which the images are subdivided into image regions and the symbols in each particular image region are encoded by entropy encoding, whereby the entropy encoding is based on one or more probability models. The term image region is here and in what follows to be construed broadly, and can refer to sections of the image of any arbitrary shape. However, in one preferred variant an image region represents an image block, e.g. a macroblock as known from video encoding. These probability models then take into account the frequencies of occurrence of symbols in image regions. Hence the probabilities of the corresponding symbols are modeled by the probability model via appropriate frequencies of occurrence, whereby several probability models will be utilized if use is made of different types of symbols with different statistics.

The image regions will be processed in the encoding cycles in such a way that, in one encoding cycle, the entropy encoding is effected in several parallel encoding branches. The term parallel encoding branches is here to be understood as encoding branches which carry out entropy encoding of image regions simultaneously or overlapping in time, as applicable. In this manner, rapid entropy encoding is achieved by the use of entropy encoders working in parallel for each encoding branch. Any particular encoding branch then encodes an image region on the basis of a set of probability models, where a set of probability models can include one or more probability models. When an image region is being encoded in any particular encoding branch, the frequencies for the set of probability models are then adapted on the basis of the symbols occurring in the image region.

The proposed method is distinguished by the fact that the set of probability models used for encoding in each encoding branch is based on a common set of probability models which is applicable for all the encoding branches, where this common set takes into account the frequencies of symbols in the image regions of all the encoding branches. This common set of probability models is in this case updated at predefined intervals of time, on the basis of frequencies adjusted in at least one temporally preceding encoding cycle. The term "temporally preceding encoding cycle" is here to be understood as an encoding cycle which was executed before (either immediately or even further back in time) the updating of the common set of probability models.

The method has the advantage that, on the one hand, rapid encoding of the symbols is achieved by the use of parallel encoding branches, and on the other hand taking into account the statistics for all the encoding branches in a common set of probability models ensures a high encoding efficiency.

The updating of the common set of probability models can be effected in various ways. In one variant, the updating of the common set of probability models is, at least at times, carried out sequentially in such a way that for updates which follow one another in time the adapted frequencies from different encoding branches are taken into account. Alternatively or additionally, the updating of the common set of probability models can also, at least at times, be effected at predefined synchronization time points, at which the common set of probability models is updated on the basis of the adapted frequencies from all the encoding branches in at least one preceding encoding cycle.

In one variant, the common set of probability models can be updated on the basis of frequencies which were adapted in the encoding cycle which was immediately preceding in time. To avoid the encoding branches mutually blocking each other, there is the additional possibility that the updating of the common set of probability models is effected on the basis of frequencies which were adapted in an encoding cycle which was not immediately preceding in time. In this way, the updating is delayed by one or more encoding cycles.

In another variant of the method, after the encoding of an image region in a particular encoding branch, the adapted frequencies are temporarily stored in an intermediate set of probability models, associated with the encoding branch concerned, whereby, until the common set of probability models is updated, one or more temporarily stored intermediate sets of probability models are used in combination with the common set of probability models for the purpose of entropy encoding in the encoding branch concerned. By the temporary storage of the adapted frequencies, it is possible to realize various variants of the encoding in a simple way.

In the method, the entropy encoding of any particular image region can be effected on the basis of any desired entropy encoding method known from the related art. In particular, use can be made of VLC encoding, already mentioned in the introduction, and/or arithmetic encoding. For example, CAVLC encoding (CAVLC=context-based adaptive variable length coding), known from the H.264/AVC video encoding standard, or CABAC encoding (CABAC=context-based adaptive binary arithmetic coding) can be used.

The arrangement of the image regions into encoding branches can be effected in various ways in accordance with the method. In particular, the encoding branches can be structured in such a way that an encoding cycle is formed by image regions which follow one another as a line-by-line or columnby-column sequence of image regions in the images. It is equally possible that the encoding branches are structured in such a way that an encoding cycle is formed by image regions which follow one another as a zigzag sequence of image regions in the images. Using the last named variant it is also possible, in particular, to achieve an encoding which takes into account the context of neighboring image regions.

The method can also, in a suitable way, be combined with known encoding variants in which the images are subdivided into image sections which are separately entropy encoded. The image sections can here, at least at times, be encoded without taking into account dependencies between the image sections and/or at least at times taking into account dependencies between the image sections. One form of embodiment of an encoding which does not take into account dependencies is represented by the partitioning based on slices, mentioned in the introduction. One variant of encoding taking into account dependencies is represented by the partitioning of images on the basis of entropy slices, mentioned in the introduction.

The method for entropy encoding can be combined with any desired video encoding methods known from the related art. In particular, the symbols can be generated from the sequence of digitized images on the basis of the H.264 standard. The symbols will, preferably, be created from the sequence of digitized images by a transformation which is known from the related art, for example a DCT transformation, and a quantization of image regions also known from the related art.

Apart from the encoding method described above, the inventor also proposed a decoding method with which the encoded symbols from a sequence of digitized images are decoded. Here, in a way analogous to the encoding method, the encoded image regions are processed in decoding cycles in such a way that, in a decoding cycle, entropy decoding is effected in several parallel decoding branches, whereby in any particular decoding branch an encoded image region is decoded on the basis of a set of probability models, whereby the frequencies for the set of probability models are adapted during the decoding of the encoded image region on the basis of the symbols occurring in the decoded image region.

The set of probability models used in each decoding branch is here based on a common set of probability models which applies to all the decoding branches, which takes into account the frequencies of symbols in the decoded image regions of all the decoding branches. The common set of probability models is updated at predetermined intervals of time on the basis of frequencies which have been adapted in at least one temporally preceding decoding cycle.

Over and above this, the inventor proposed a method for encoding and decoding a sequence of digitized images, where symbols from a sequence of digitized images are encoded using the encoding method described above and are then, for example after being transmitted over a transmission link, decoded using the decoding method described above.

A device encodes symbols from a sequence of digitized images, by which the images are subdivided into image regions and the symbols in any particular image region can be encoded by the device by entropy encoding based on one or more probability models, where the probability model/s takes/take into account the frequencies of symbols occurring in image regions, where the device incorporates a processing unit which incorporates:
  a facility for dividing up the image regions into encoding cycles in such a way that the entropy encoding in an encoding cycle is effected in several parallel encoding branches;
  a plurality of encoding facilities, where each encoding facility serves for the entropy encoding in a particular encoding branch in such a way that in any particular encoding branch an image region is encoded on the basis of a set of probability models, where each encoding facility incorporates:
  an adaptation facility for adapting the frequencies for the set of probability models, during the encoding of the image region, on the basis of the symbols occurring in the image region,
  a facility for processing a common probability model in such a way that the set of probability models used for the purpose of encoding in any particular encoding branch is based on the common set of probability models, which applies for all the encoding branches and which takes into account the frequencies of symbols in the image regions of all the encoding branches;
  a facility for updating at predefined intervals of time the common set of probability models, on the basis of frequencies which have been adapted in at least one temporally preceding encoding cycle.

The encoding device is thus suitable for encoding the symbols from a sequence of digitized images on the basis of the method, whereby in particular one or more of the forms of embodiment of the method, described above, can be realized using appropriate further facilities in the encoding device.

Apart from the encoding device, a corresponding decoding device decodes encoded symbols from a sequence of digitized images, where the images are subdivided into image regions and the symbols in any particular image region have been encoded by entropy encoding based on the encoding method, where the entropy decoding is based on one or more probability models, where the probability model/s takes/take into account the frequencies of symbols occurring in decoded image regions. Here, the device incorporates a processing unit which contains:
  a facility for dividing up the encoded image regions into decoding cycles in such a way that the entropy decoding in a decoding cycle is effected in several parallel decoding branches;
  a plurality of decoding facilities, where each decoding facility serves for the entropy decoding of a particular decoding branch in such a way that in the decoding branch concerned an encoded image region is decoded on the basis of a set of probability models, where each decoding facility incorporates:
  an adaptation facility for adapting the frequencies for the set of probability models, during the decoding of the encoded image region, on the basis of the symbols which occur in the decoded image region,
  a facility for processing a common probability model in such a way that the set of probability models used for the purpose of decoding in a particular decoding branch is based on the common set of probability models which applies for all the decoding branches, which takes into account the frequencies of symbols in the decoded image regions of all the decoding branches;
  a facility for updating at predefined intervals of time the common set of probability models, on the basis of frequencies which have been adapted in at least one temporally preceding decoding cycle.

Apart from the encoding device described above and the decoding device described above, the inventor proposed a codec or a system for the encoding and decoding of symbols from a sequence of digitized images, as applicable, where the codec incorporates both the encoding device and the decoding device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1A:
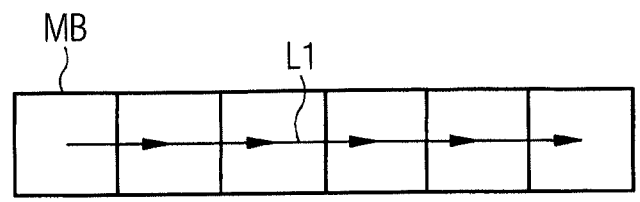
FIG. 1A to 1C and FIG. 2A and 2B show various encoding techniques known from the related art.
Figure 1B:
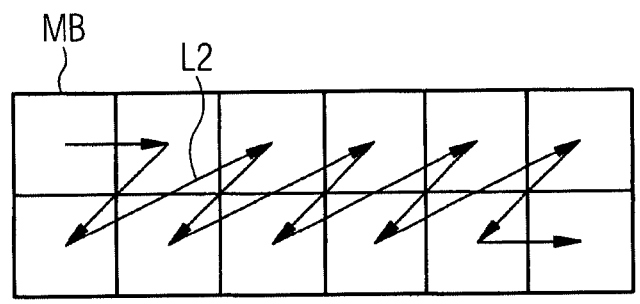
Figure 1C:
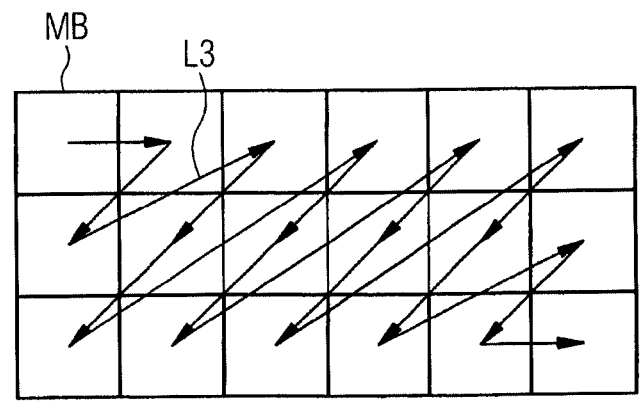
Figure 2A:
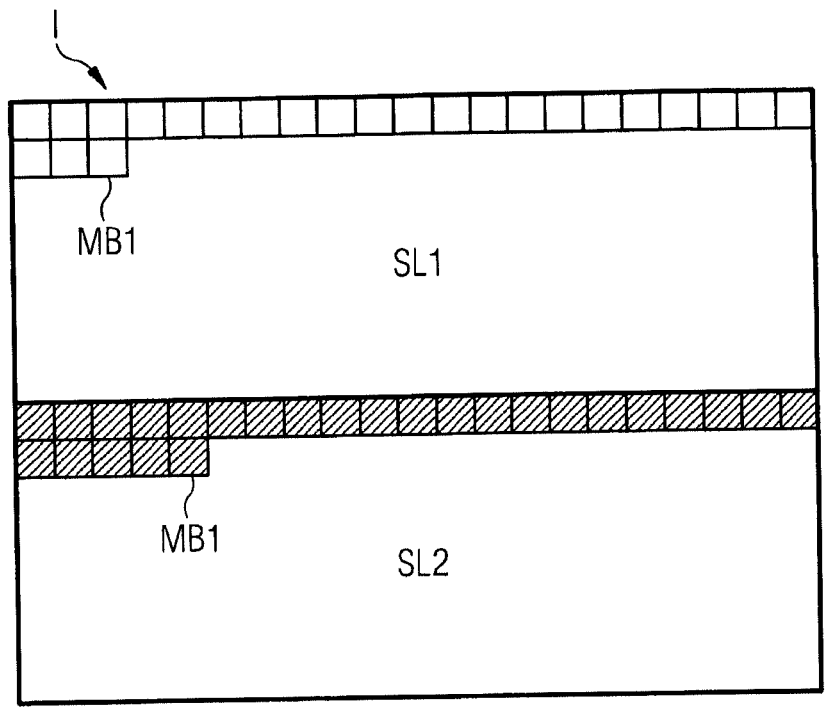
Figure 2B:
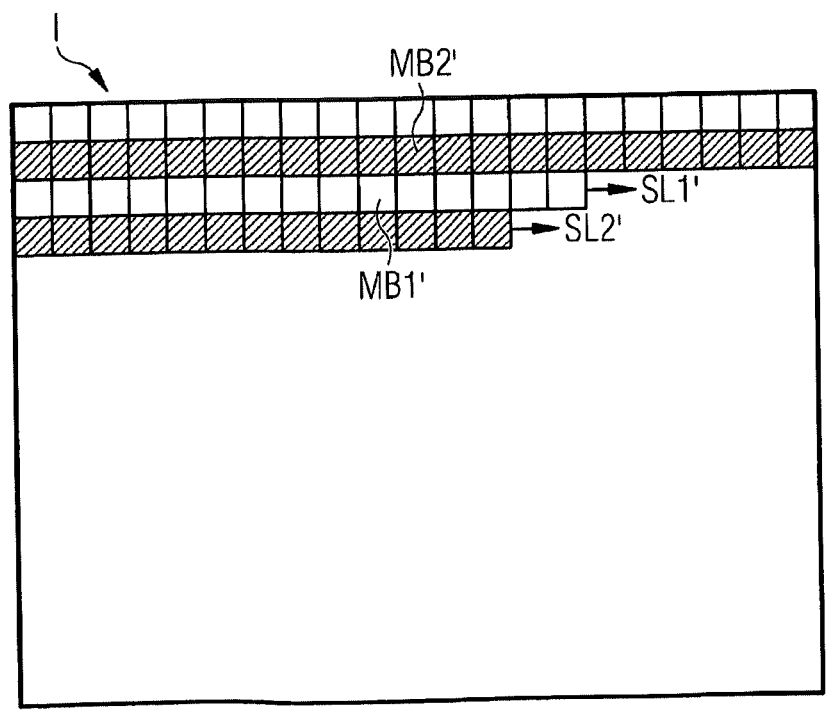

Reference will now be made in detail to the preferred embodiments of the present invention, examples of which are illustrated in the accompanying drawings, wherein like reference numerals refer to like elements throughout.

The encoding variants known from the related art, shown in FIGS. 1A to 1C and FIGS. 2A and 2B, have already been explained above, so that further description of these figures is omitted.

The forms of embodiment of the proposed entropy encoding and entropy decoding method respectively, described below, are distinguished by the fact that several image regions are processed in parallel in different encoding branches, in which however the individual encoding branches access a common probability model which takes into account the frequency distributions of the symbols in all the encoding branches. This probability model is updated at regular intervals, on the basis of the changing frequencies of the symbols which are to be encoded or decoded, as applicable. The symbols are here generated in the context of a video encoding method, such a method being illustrated schematically in FIG. 3.

Figure 3:
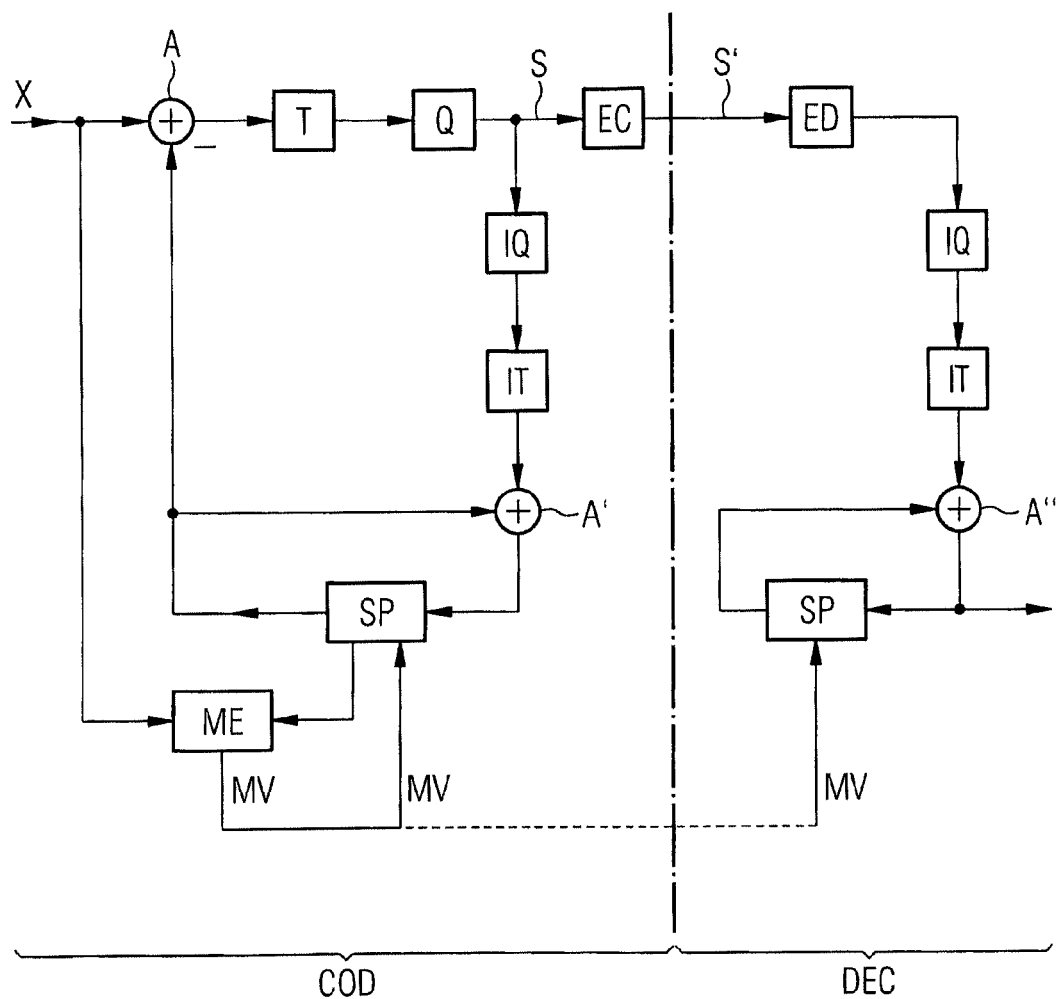
FIG. 3 is a diagram of the principle of a method for video encoding and video decoding, in which the proposed entropy encoding or entropy decoding can be used.

The left hand part of FIG. 3 shows an appropriate encoder COD, and the right hand part of FIG. 3 the decoder DEC used for the purpose of decoding. As shown in FIG. 3, a video stream of digitized images I is subjected to encoding, whereby a prediction error signal, which is given by the difference between the input signal I and the motion-compensated reconstruction of the previous image, is compressed. The prediction error, which in FIG. 3 has been determined in the adder A as the difference between the image read in and the predicted image, is subjected to a transformation T, in particular a DCT transformation (DCT =discrete cosine transformation). The transformation coefficient obtained from this is then quantized in an appropriate way in the quantizer Q. In this way, for the appropriate image regions in the form of macroblocks, symbols S are obtained in each case, these representing encoded image data from the image region, in particular in the form of transformation coefficients, and motion vectors used for the purpose of prediction, together with other encoding parameters. The motion vectors determined in the context of the encoding are here identified by MV, and these motion vectors are also required during the decoding, as indicted in FIG. 3 by a vertical dashed line. In order to further increase the encoding efficiency, the symbols S are again entropy encoded without loss in an entropy encoder EC, whereby a special variant of entropy encoding is used.

As can be seen in FIG. 2, the quantized symbols S are also subjected to an inverse quantization IQ and an inverse transformation IT as part of the encoding. The signal generated in this manner finally passes into an image store SP, the output from which is on the one hand fed back via the adder A' to its input, and also the negative of the output passes via the adder A to the input of the transformation T. In this manner, the image store controls a motion estimator ME, which in its turn has applied to its input side the video input data, and which provides the motion vectors MV, already mentioned above, to actuate the image store SP in the encoder COD. As already explained, these motion vectors are also transmitted to the decoder DEC, whereby the motion vectors are also entropy encoded for this purpose, this not being apparent from FIG. 1. The code words S' generated by the entropy encoder are then finally transmitted to the decoder DEC and there they are initially subjected to a suitable entropy decoding. In this manner, the symbols S generated on the encoder side are reconstructed again, and are then subjected to an inverse quantization IQ and an inverse transformation IT. The decoded video data thus determined is then added to the data from an appropriate image store SP on the decoder side DEC, and represent the output from the decoder. This summation signal is fed in addition to the image store SP on the decoder side, the output from which is fed back to the input to the adder A".

Below are described forms of embodiment of the proposed entropy encoding and entropy decoding, based on the relevant symbols in a macroblock in corresponding video images. In the variants presented here, three encoding branches are encoded in an appropriate encoding cycle, where one macroblock is entropy encoded in each encoding branch of an encoding cycle. The individual encoding branches thus represent different groups of macroblocks which, depending on the form of embodiment, are different components of the image.

Figure 4A:
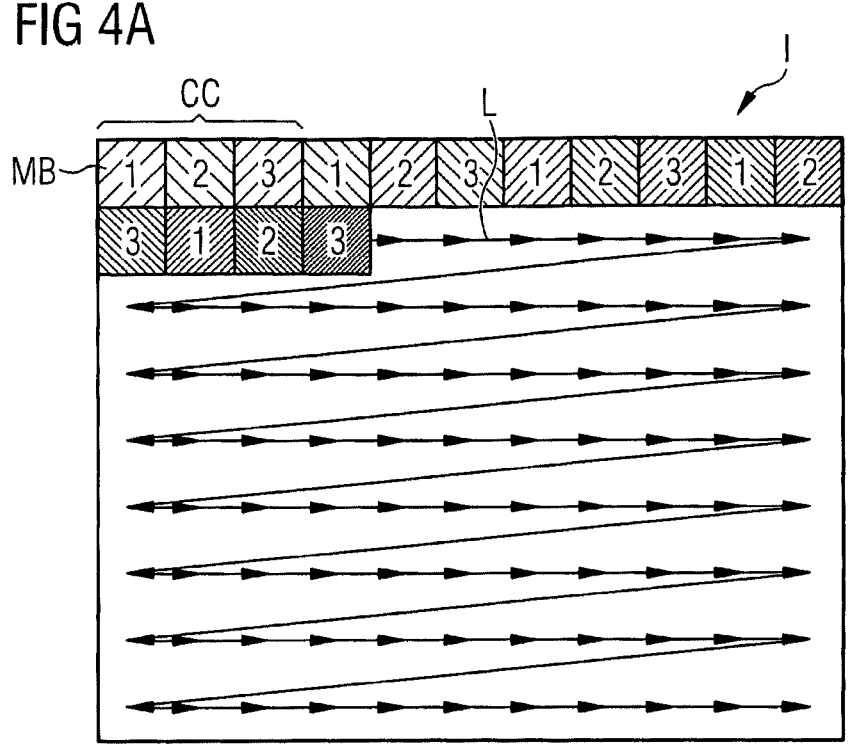
FIG. 4A and 4B are two variants on the parallel processing of macroblocks based on the proposed method.

FIG. 4A shows a first variant of the grouping of macroblocks MB into three encoding branches. The macroblocks of the first encoding branch are here denoted by the reference mark 1, the macroblocks of the second encoding branch by the reference mark 2 and the macroblocks of the third encoding branch by the reference mark 3. These reference marks are also used for identifying the corresponding encoding branches. In the form of embodiment shown in FIG. 4A, one encoding cycle CC is formed by three successive macroblocks 1, 2 and 3. For the purpose of encoding, the image is thus read in line-by-line, as indicated by the line L in FIG. 4A. The grouping as shown in FIG. 4A is then suitable for entropy encoding, in which no data from neighboring macroblocks is used for modeling the context.

Figure 4B:
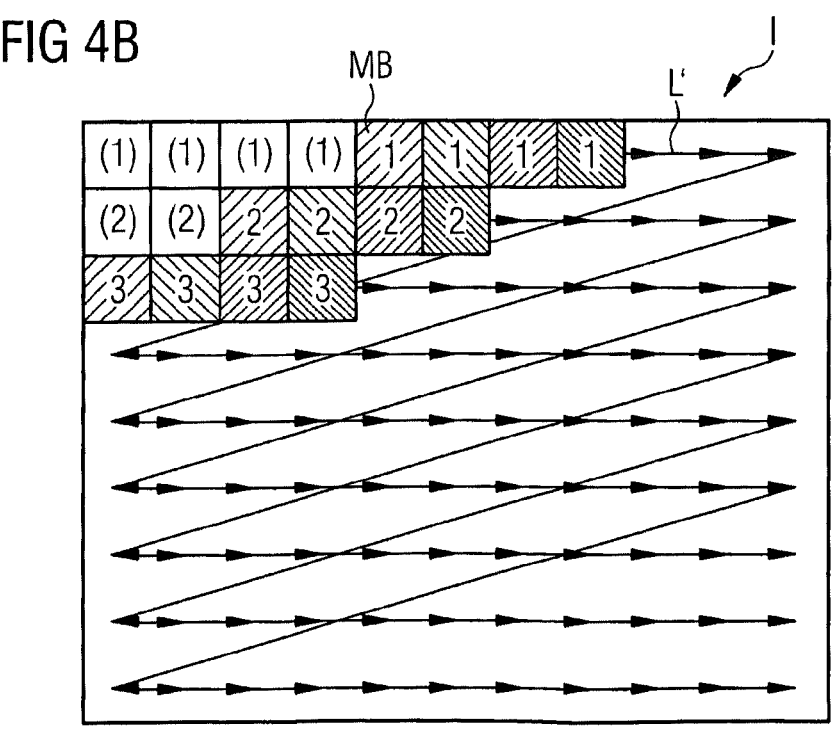

In contrast to this, FIG. 4B shows a further variant of the formation of encoding branches, which permits context modeling based on items of data from neighboring macroblocks. The encoding branches are here in each case formed by neighboring lines in the image I, so that in FIG. 4B the first line forms the first encoding branch 1, the second line forms the second encoding branch 2 and the third line the third encoding branch 3. The processing of the individual encoding branches is effected with an overlap, whereby the encoding in one encoding branch is offset in time by two macroblocks relative to the encoding branch of the next line, this being indicated by the line L'. FIG. 4B here shows one scenario in which some macroblocks have already been encoded, with these macroblocks being indicated by appropriate reference marks in parentheses. In turn, the encoding takes place in parallel encoding branches, whereby an encoding cycle now processes macroblocks, from the encoding branches concerned, which are offset by two macroblocks relative to each other. The successive encoding branches are thus formed in accordance with a zigzag pattern through the macroblocks in the image. For example, one encoding cycle CC corresponding to FIG. 4A is formed in FIG. 4B by the fifth macroblock 1 in the first line of the image I, the third macroblock 2 in the second line of the image I together with the first macroblock 3 in the third line of the image I.

As already mentioned, it is possible with the form of embodiment shown in FIG. 4B to achieve modeling of a context on the basis of neighboring macroblocks. Nonetheless, this form of embodiment can also be used with a method for encoding with no context modeling. Apart from the groupings of macroblocks in encoding branches which are processed in parallel, shown in FIGS. 4A and 4B, other groupings are conceivable if necessary. In the context of this document, the only critical factor is that all the encoding branches access a common set of probability models in carrying out the entropy encoding, as will be explained in more detail below.

FIG. 5 to FIG. 8 show different variants of the proposed entropy encoding with different types of updating of a common set of probability models. Without loss of generality, the individual encoding branches are here formed on the basis of line-by-line processing of macroblocks, as in FIG. 4A. As part of the entropy encoding of a macroblock, the frequencies of the symbols are here taken into account on the basis of a set of probability models, where a set can contain one or more probability model(s). Here, each probability model takes into account a context (i.e. an appropriate type of symbols and/or encoding decisions for blocks which have already been encoded). For example, different probability models can be used for different data which is to be encoded, such as for example for transformation coefficients, motion vectors and items of encoding mode data.

The entropy encoding of a macroblock in an individual encoding branch is carried out on the basis of a commonly-used entropy encoding method, for example on the basis of the VLC encoding mentioned in the introduction, or arithmetic encoding, as appropriate. In particular, use can be made of the CABAC or CAVLC encoding methods, as appropriate, known from the related art. The entropy encoding in an individual encoding branch is thus performed on the basis of known methods, but this entropy encoding makes use in an appropriate way of a common set of probability models, in which the frequencies of the symbols from all the parallel encoding branches are taken into account.

In each of the figures FIGS. 5 to 8 described below, appropriate arrows indicate which set of probability models is being accessed by a macroblock while it is being encoded. In this process, as part of the entropy encoding of the individual macroblocks the set of probability models used in each case for the entropy encoding is adapted and stored in an intermediate set of probability models, where the intermediate sets of probability models are discarded again in the course of the method after an update of the common set of probability models, already mentioned above. In what follows, the intermediate sets of probability models are referred to as shadow sets.

Figure 5:
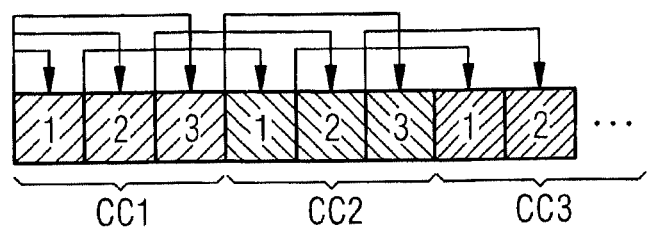
FIG. 5 to FIG. 8 show different variants of the proposed encoding method with different updating of the common probability model.

FIG. 5 shows a variant of the proposed entropy encoding, in which the common set of probability models is adjusted sequentially by the adapted frequencies of the individual encoding branches. Here, the origin of an arrow in FIG. 5, and also in all the subsequent FIGS. 6 to 9, shows the set of probability models which is being accessed for the macroblock (currently being encoded) at which the point of the arrow concerned is positioned. In the form of embodiment in FIG. 5, the symbols for the macroblock in each of the encoding branches 1 to 3 are first encoded in the encoding cycle CC1. In doing this, independent adaptive entropy encoders are used for each of the branches. Because the macroblock which is being encoded is the first in each encoding branch, the same initial standard statistics (i.e. probability models) are used in the encoding for all the encoding branches. As part of the encoding of each encoding branch, the original set of probability models is adjusted in each encoding branch on the basis of the appropriate frequencies of symbols, so that for each encoding branch a first shadow set of probability models is generated. In doing this, these shadow sets of probability models need only contain the modified probability models for the appropriate symbol types. Unmodified probability models do not need to be stored. The original standard statistics represent the first version of a common set of probability models, which will then be updated in the course of the encoding.

In the form of embodiment in FIG. 5, the encoding of macroblock 1 in the encoding cycle CC2, which follows the encoding of macroblock 1 in the first encoding cycle CC1, takes place even without the need to wait for the encoding of macroblocks 2 and 3 in the encoding cycle CC1 to terminate. In doing this, as part of the encoding of macroblock 1 in the second encoding cycle CC2, a second shadow set of probability models is generated, which stores the change compared to the first shadow set of probability models. The encoding decisions are made on the basis of the original common set of probability models together with the first and second shadow sets of probability models.

After completion of the encoding of the macroblocks 2 and 3 in the first encoding cycle CC1, the common set of probability models is updated using the first shadow set of probability models which was generated during the encoding of macroblock 1 in the encoding cycle CC1. This first shadow set of probability models can then be discarded. Finally, macroblock 2 is encoded in the second encoding cycle CC2, whereby from now on it is the updated common set of probability models which is accessed. Here, in the encoding of the macroblock, account is taken in turn of a previously generated first shadow set of probability models, which was generated during the encoding of the corresponding macroblock 2 in the first encoding cycle CC1. In an analogous way as with macroblock 1 in the second encoding branch CC2, in the encoding of macroblock 2 in the second encoding cycle CC2 a further second shadow set of probability models is now generated, with the encoding of macroblock 2 in the encoding cycle CC2 being based on the updated common set of probability models together with the first and second shadow sets of probability models.

As soon as macroblock 1 has been encoded in the second encoding cycle CC2, the common set of probability models can be updated with the first shadow set of probability models from the encoding of macroblock 2 in the first encoding cycle CC1. In an analogous way, after the encoding of macroblock 2 in the second encoding cycle CC2, the common set of probability models is updated using the first shadow set of probability models from the encoding of macroblock 3 in the first encoding cycle CC1. The method is continued in this way, until all the macroblocks have been encoded.

As implied by the above description of the exemplary embodiment in FIG. 5, the encoding of macroblock 2 in encoding branch CC2 can only begin when the common set of probability models has been updated using the first shadow set of probability models from the encoding of macroblock 1 in encoding cycle CC1. However, this updating can only be carried out when macroblock 3 has been fully encoded in the first encoding cycle CC1, because otherwise encoding branch 3 would be using incorrect statistics.

For this reason, in a development of the above method, not only are the shadow sets of probability models generated, these being specific to particular encoding branches, but temporary sets of probability models for the common set of probability models are also generated taking into account one of more of the already encoded shadow sets of probability models. In this way, it is possible to carry out encoding in an encoding branch of a new encoding cycle on the basis of an appropriate temporary set of probability models, even if encoding is still taking place in an encoding branch of the preceding encoding cycle. As soon as the encoding actions in the encoding branches of the preceding encoding cycle are completed, and the common set of probability models has been updated, the corresponding temporary set of probability models is no longer required. The temporary sets of probability models thus generated do not need to be generated in full, but it is sufficient to calculate only those probability models in which the frequencies of the symbols have changed.

Figure 6:
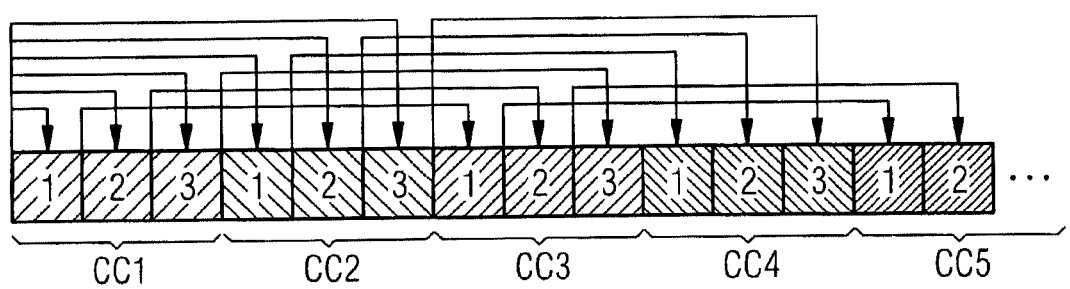

The variant described above, for the sequential updating of the common set of probability models, can also be developed in a suitable way for delayed updating, whereby the common set of probability models is not updated with corresponding shadow sets of probability models from the preceding cycle but with those from a cycle lying even further back. Such a variant is shown in FIG. 6. It will be seen here that an initial set of standard probability models is used at first, for the first and second encoding cycles CC1 and CC2, and only in the third encoding cycle is a corresponding update of the common set of probability models carried out using shadow sets of probability models generated in the course of the encoding in the first encoding cycle CC1. In the same way, the common set of probability models is updated in the fourth encoding cycle CC4 using shadow sets of probability models from the second encoding cycle CC2 and the common set of probability models in the fifth encoding cycle CC5 using shadow sets of probability models from the third encoding cycle CC3. The advantage of the variant in FIG. 6 is that as a rule the encoding branches do not mutually block each other. Furthermore, it is also the case that only two shadow sets of probability models are required, if the updating is delayed by one encoding cycle, as indicated in FIG. 6. If the delay amounts to more than one encoding cycle, additional shadow sets of probability models are required. The greater the delay in the updating, the greater the deviation which can be tolerated in the speed of the encoding branches without the encoding branches mutually blocking each other. However, because of the delayed updating of the statistics, the encoding efficiency is somewhat degraded.

Figure 7:
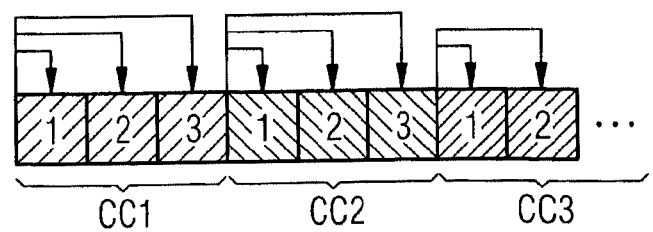
Figure 8:
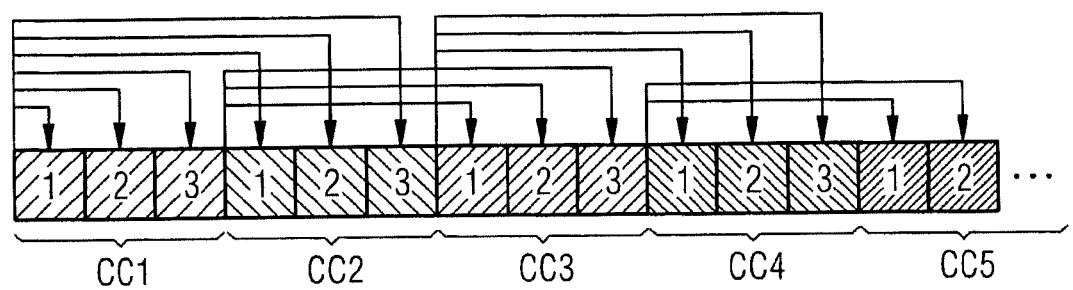

FIG. 7 shows a third variant of the updating of the common set of probability models. In this variant, after the individual encoding actions are completed in each encoding cycle the common set of probability models is updated, at a fixed synchronization time point, using all the shadow sets of probability models, generated for each encoding branch. This avoids the generation of several shadow sets of probability models per encoding branch. However, the encoding speed of any encoding cycle is determined by the slowest encoding branch. Here, the synchronization time points do not need to be set to follow the ending of each encoding cycle. Rather, there is also the possibility that an update is carried out after a predefined number of encoding cycles. This variant has the advantage that the common set of probability models no longer needs to be updated so often, and a larger deviation in the encoding speed of the encoding branches is tolerated. FIG. 8 shows such a variant of the updating of encoding branches, in which the updating is in each case carried out only after two encoding cycles. In FIG. 8 it will be seen, in particular, that for each of the encoding cycles CC1 and CC2 the same common set of probability models is used, with an update of this common set of probability models, taking into account the shadow sets from the first encoding cycle CC1, being carried out at the start of encoding cycle CC3.

Figure 9:
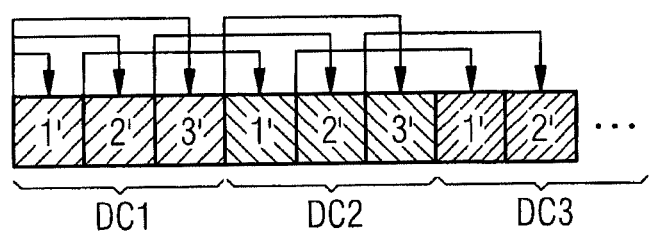
FIG. 9 is a decoding of symbols which have been encoded using the variant of the method shown in FIG. 5.

Decoding of the symbols encoded using the method described above proceeds in an analogous way to the encoding. That is to say, the decoding is carried out in parallel decoding branches, in doing which the common set of probability models is in turn updated on the basis of the frequencies of the decoded symbols. Described below by way of example is a decoding process which is based on encoded symbols which have been generated using the encoding process shown in FIG. 5. This decoding process is represented in FIG. 9, where appropriate arrows again indicate which set of probability models is being accessed by a macroblock while it is being decoded. The decoding takes place in corresponding decoding cycles, DC1, DC2, DC3 etc., within which corresponding decoding branches 1', 2' and 3' are now executed in parallel to decode the appropriately encoded macroblocks. Each of the decoding branches 1', 2' and 3' is thus decoded in a separate decoding process. In doing this, the macroblocks in the first decoding cycle DC1 are first decoded using the suitable initial set of standard probability models. The updates of frequencies for the decoded symbols, derived during the decoding, are again stored in individual shadow sets of probability models.

After the decoding of macroblock 1' in the first decoding cycle DC1, the decoding of macroblock 1' is effected in the second decoding cycle DC2 using a second shadow set of probability models. When the entropy decoding for macroblocks 2' and 3' has been completed in the first decoding cycle DC1, the common set of probability models is updated, in an analogous way as for the encoding, using the first shadow set of probability models for macroblock 1' in decoding cycle DC1.

Finally, the decoding of macroblock 2' in the second encoding cycle DC2 is effected, where for this purpose the updated common set of probability models is now used. Alternatively, it is also possible to start the entropy decoding of macroblock 2' in decoding cycle DC2 even before starting to carry out the updating, if a temporary set of probability models is generated in decoding cycle DC1 from the common set of probability models and the first shadow set of probability models for macroblock 1'. In a similar way, the decoding branch 3' begins decoding if the common set of probability models has been updated in the first decoding cycle DC1 using the first shadow set of probability models from macroblock 2'. Alternatively, a temporary set of probability models can be used for the decoding of macroblock 3' in the second decoding cycle DC2, if the decoding of macroblocks 1' and 2' in the first decoding cycle DC1 has been completed. The encoding is continued on the basis of the above steps for all subsequent encoding cycles, with appropriate updates, until all the macroblocks have been decoded.

The main parameters which must be signaled to the decoder in the application of the method described above are, on the one hand, the number N of parallel encoding branches, where this number is N=3 in the examples in FIG. 3 or FIG. 8 respectively. For the case where N=1, the method corresponds to conventional entropy encoding, such as is used in the H.264/AVC standard, for example. A further parameter which must be transmitted is the delay D in the updating of the common set of probability models. In the forms of embodiment in FIG. 5 and FIG. 7, this parameter is D=0 encoding cycles. For the forms of embodiment in FIG. 6 and FIG. 8, D=1. Another parameter which must be communicated is whether a synchronized update is carried out at predefined synchronization time points. In the forms of embodiment in FIG. 7 and FIG. 8, a synchronized update is signaled, whereas in the forms of embodiment in FIG. 5 and FIG. 6 it is signaled that no synchronized update is performed.

The variants of the proposed method described above can be combined with suitable methods for the modeling of contexts, such as the entropy slices described above, or with ordered entropy slices or interleaved entropy slices, as appropriate. The method can also be combined with the syntax element partitioning described above, or with parallel processing of several binary symbols in accordance with publications [3] and [4].

As a rule, the updating of the common set of probability models must be carried out whenever there is a pause in the entropy encoding in the individual encoding branches. However, if necessary there is also the possibility of updating individual probability models in the common set of probability models in an 'atomic' fashion. In this case, the individual encoding branches can continue with their encoding without interruption. Here, atomic updating means that in the updating of a probability model a read access to this model by the encoding branch is suppressed and, after the updating of the probability model, the corresponding probability model is deleted from the encoding branch's shadow set of probability models.

The forms of embodiment of the method, described above, have been described on the basis of an encoding of individual macroblocks. However, the method can be applied to any other arbitrary image regions with a sequence of images which is to be encoded, and is not restricted to macroblocks.

The method has a range of advantages. In particular, a high compression efficiency is achieved because one common set of probability models, which is updated at regular intervals using the adapted statistics from the encoding branches, is used for all the encoding branches. In this manner, the statistics in the common set of probability models is a better approximation to the actual probabilities than if separate independent sets of probability models are used. In addition, the parallel encoding or decoding, as applicable, by several encoding or decoding branches respectively, achieves rapid encoding and decoding with little delay. Over and above this, the method can also be combined in a suitable way with other parallel processing methods for the purpose of context-based adaptive entropy encoding.

Figure 10:
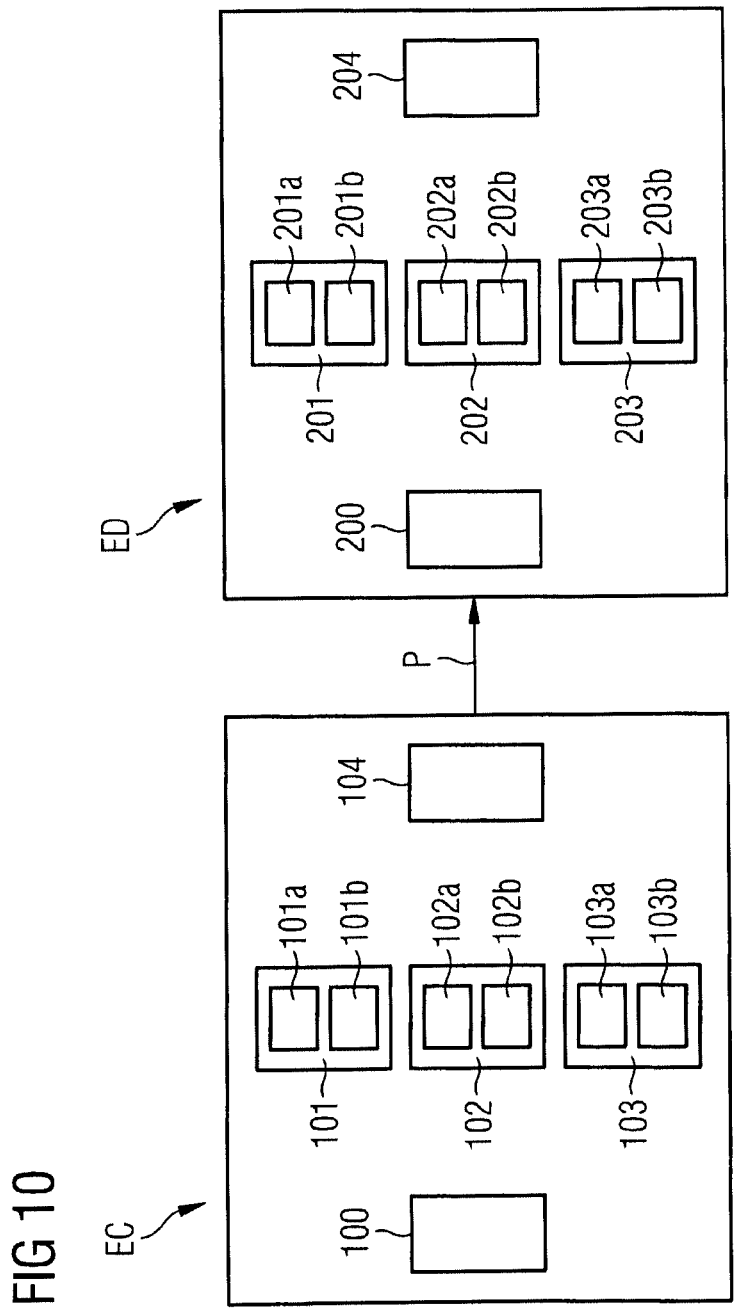
FIG. 10 is a schematic diagram of a form of embodiment of an encoding and decoding system in accordance with the proposals.

FIG. 10 shows a schematic representation of a concrete embodiment of a system comprising an encoding device and a decoding device. The encoding device is used for entropy encoding of a sequence of digitized images and is labeled EC, as in FIG. 3. The decoding device is used for decoding the sequence of digitized images which have been entropy encoded with the device EC, and is labeled ED as in FIG. 3. The device EC and the device ED each contains a plurality of components, which can take the form of individual hardware components, for example hardware components in a computer. In the same way, the device ED also contains a plurality of components, which can take the form of individual hardware components, for example hardware components in a computer.

Apart from the components shown in FIG. 10, the device EC can if necessary contain as additional components those components shown in FIG. 3, in the form of a transformation unit T, a quantizer Q, an inverse quantizer IQ, an inverse transformation unit IT, an image store SP, a motion estimator ME, together with appropriate adders A and A'. All these components can in turn be realized as individual hardware components.

In the embodiment in FIG. 10, the device EC contains a facility 100 for dividing up the image regions, in the images which are being processed, into encoding cycles. In this case, in any one encoding cycle the entropy encoding is carried out in several parallel encoding branches. For the purpose of carrying out the encoding in the encoding branch concerned, the device EC contains, for example, three encoding facilities 101, 102 and 103, where each encoding facility is provided for the encoding in the encoding branch concerned. If it is to be possible to encode more than three encoding branches using the device, a correspondingly larger number of encoding facilities is provided. Each encoding facility carries out entropy encoding on the basis of a set of probability models.

The encoding facility 101 contains, as sub-components, an adaptation facility 101a together with a facility 101 b for processing a common probability model. In an analogous way, the encoding facilities 102 and 103 also contain corresponding adaptation facilities, 102a or 103a respectively, and corresponding facilities, 102b or 103b respectively, for processing a common probability model. The adaptation facility in the encoding branch concerned is here used during the encoding of the image region for adapting the frequencies, for the set of probability models, on the basis of the symbols which occur in the image region. The facility provided in each encoding branch for the processing of a common probability model carries out the processing in such a way that the set of probability models used for encoding in the encoding branch concerned is based on the common set of probability models which is applicable for all the encoding branches, which takes into account the frequencies of symbols in the image regions of all the encoding branches. Also provided in the device EC is a facility 104 for updating the common set of probability models at predefined intervals of time on the basis of frequencies which have been adapted in at least one temporally preceding encoding cycle.

The encoding device EC shown in FIG. 10 supplies an encoded sequence of digitized images, which can be transmitted to the decoding device ED over any desired transmission link. The transmission over the transmission link is here indicated in FIG. 10 by the arrow P. The decoding device ED receives the encoded image stream and carries out a corresponding entropy decoding, whereby the device has a plurality of components for this purpose. In particular, the device ED incorporates a facility for dividing up the encoded image regions in the encoded sequence of digitized images into decoder cycles in such a way that in any one decoding cycle entropy decoding is effected in several parallel decoding branches. Here, a corresponding decoding facility, 201 or 202 or 203, is provided for each decoding branch, whereby if there are more than three decoding branches further corresponding decoding facilities are integrated into the device ED. Each decoding facility carries out entropy decoding on the basis of a set of probability models.

The decoding facility 201 incorporates an adaptation facility 201a for adapting the frequencies for the set of probability models, during the decoding of the encoded image region, on the basis of the symbols which occur in the image region decoded. Over and above this, a facility 201 b is provided for processing a common probability model in such a way that the set of probability models used in the decoding branch concerned for the purpose of decoding is based on the set of probability models, which is applicable for all the decoding branches and which takes into account the frequencies of symbols in the decoded image regions of all the decoding branches. In an analogous way to the decoding facility 201, the decoding facilities 202 and 203 also incorporate corresponding adaptation facilities, 202a or 203a respectively, for adapting the frequencies, and a corresponding facility, 202b or 203b respectively, for processing a common probability model. In addition, a further component incorporated in the decoding device ED in FIG. 10 is a facility 204 for updating the common set of probability models at predefined intervals of time on the basis of frequencies which have been adapted in at least one temporally preceding decoding cycle.

Using the decoding device ED, a decoded sequence of digitized images is obtained. Here, the decoding device can if necessary also contain the additional components shown in FIG. 3, in the form of an inverse quantizer IQ and an inverse transformation unit IT, together with a store SP and an adder A". These additional components can here be in the form of individual hardware components, e.g. hardware components of a computer.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v.* DIRECTV, 69 USPQ2d 1865 (Fed. Cir. 2004).

The invention claimed is:

1. A method for encoding symbols from a sequence of digitized images, comprising:
    subdividing the images into image regions, each having symbols;
    processing the image regions in encoding cycles in such a way that within each encoding cycle, a plurality of image regions are processed in parallel in respective parallel encoding branches, whereby within each encoding branch, symbols of the respective image region are encoded using a respective entropy encoding, the respective entropy encoding being based on a set of one or more intermediate probability models, the one or more intermediate probability models taking into account frequencies of occurrence of the symbols in the respective image region and, when the respective image region is being encoded, frequencies for the respective set of one or more intermediate probability models being adapted based on the symbols occurring in the respective image region, each respective set of the one or more intermediate probability models being determined based on a common set of probability models that is applicable to all of the encoding branches, the common set of probability models taking into account frequencies of occurrence of the symbols in all of the image regions; and
    updating the common set of probability models at predefined intervals of time based on frequencies adapted in at least one temporally preceding encoding cycle.

2. The method as claimed in claim 1, wherein updating of the common set of probability models is effected sequentially in such a way that for temporally successive updates, the frequencies of occurrence are updated based on sequentially different encoding branches.

3. The method as claimed in claim 1, wherein
    the updating of the common set of probability models is effected at predefined synchronization time points, and
    at each predefined synchronization time point, the common set of probability models is updated based on frequencies of occurrence that have been updated based on updated information from all the encoding branches.

4. The method as claimed in claim 1, wherein the updating of the common set of probability models is effected, at least at times, based on frequencies of occurrence that have been updated with information from a temporally immediately preceding encoding cycle.

5. The method as claimed in claim 4, wherein the updating of the common set of probability models is effected, at least at times, based on frequencies of occurrence that have been updated with information from a preceding encoding cycle other than a temporally immediately preceding encoding cycle.

6. The method as claimed in claim 1, wherein the updating of the common set of probability models is effected, at least at times, based on frequencies of occurrence that have been updated with information from a preceding encoding cycle other than a temporally immediately preceding encoding cycle.

7. The method as claimed in claim 1, wherein
    each branch produces temporary branch-update frequency of occurrence (FOO) information, the branch update FOO information having an associated temporary intermediate set of probability models,
    the common set of probability models is updated using the branch-update FOO information only at update times,
    the branch-update FOO information and the intermediate set of probability models are reset at the update times, and
    between update times, the intermediate set of probability models is used in combination with the common set of probability models for entropy encoding in the encoding branch.

8. The method as claimed in claim 1, wherein entropy encoding uses context-based adaptive length coding (CAVLC) and/or context-adaptive binary arithmetic coding (CABAC).

9. The method as claimed in claim 1, wherein the encoding branches are structured in such a way that each encoding cycle encodes image regions which follow one another in a line-by-line or column-by-column sequence of in the image.

10. The method as claimed in claim 1, wherein the encoding branches are structured in such a way that each encoding cycle encodes image regions which follow one another in a zigzag sequence in the image.

11. The method as claimed in claim 1, wherein the images are subdivided into image sections which are separately entropy encoded.

12. The method as claimed in claim 11, wherein
    the image sections are sometimes encoded without taking into account dependencies between the image sections, and
    at other times, the image sections are encoded taking into account dependencies between the image sections.

13. The method as claimed in claim 1, wherein the symbols are generated from the sequence of digitized images by a transformation and quantization of image regions.

14. The method as claimed in claim 1, wherein the symbols are generated from the sequence of digitized images based on an H.264 video encoding standard.

15. A method comprising:
   decoding encoded symbols from respective encoded image regions, by a process comprising:
      processing the encoded image regions in decoding cycles in such a way that within each decoding cycle, a plurality of encoded image regions are processed in parallel in respective parallel decoding branches, whereby within each decoding branch, a respective entropy decoding decodes the symbols of a respective encoded image region, the respective entropy decoding being based on a set of one or more intermediate probability models, the one or more intermediate probability models taking into account frequencies of occurrence of the symbols in the respective image region and, when the respective image region is being decoded, frequencies for the respective set of one or more intermediate probability models being adapted based on the symbols occurring in the respective image region, each respective set of the one or more intermediate probability models being determined based on a common set of probability models that is applicable to all of the decoding branches, the common set of probability models taking into account frequencies of occurrence of the symbols in all of the image regions; and
      updating the common set of probability models at predefined intervals of time based on frequencies adapted in at least one temporally preceding encoding cycle.

16. The method as claimed in claim 15, further comprising encoding symbols from a sequence of digitized images, by a process comprising:
   subdividing the images into image regions, each having symbols;
   processing the image regions in encoding cycles in such a way that within each encoding cycle, a plurality of image regions are processed in parallel in respective parallel encoding branches, whereby within each encoding branch, symbols of the respective image region are encoded using a respective entropy encoding, the respective entropy encoding being based on a set of one or more intermediate probability models, the one or more intermediate probability models taking into account frequencies of occurrence of the symbols in the respective image region and, when the respective image region is being encoded, frequencies for the respective set of one or more intermediate probability models being adapted based on the symbols occurring in the respective image region, each respective set of the one or more intermediate probability models being determined based on a common set of probability models that is applicable to all of the encoding branches, the common set of probability models taking into account frequencies of occurrence of the symbols in all of the image regions; and
   updating the common set of probability models at predefined intervals of time based on frequencies adapted in at least one temporally preceding encoding cycle.

17. A device to encode symbols from a sequence of digitized images, comprising:
   a processor to:
      subdivide the images into image regions, each having symbols;
      process the image regions in encoding cycles in such a way that within each encoding cycle, a plurality of image regions are processed in parallel in respective parallel encoding branches, whereby within each encoding branch, symbols of the respective image region are encoded using a respective entropy encoding, the respective entropy encoding being based on set of one or more intermediate probability models, the one or more intermediate probability models taking into account frequencies of occurrence of the symbols in the respective image region and, when the respective image region is being encoded, frequencies for the respective set of one or more intermediate probability models being adapted based on the symbols occurring in the respective image region, each respective set of the one or more intermediate probability models being determined based on a common set of probability models that is applicable to all of the encoding branches, the common set of probability models taking into account frequencies of occurrence of the symbols in all of the image regions; and
      update the common set of probability models at predefined intervals of time based on frequencies adapted in at least one temporally preceding encoding cycle.

18. A device for encoded symbols from a sequence of digitized images, comprising:
   a processor to:
      process encoded image regions in decoding cycles in such a way that within each decoding cycle, a plurality of encoded image regions are processed in parallel in respective parallel decoding branches, each encoded image region having encoded symbols, whereby within each decoding branch, a respective entropy decoding decodes a respective encoded image region, the entropy decoding being based on a set of one or more intermediate probability models, the common set of probability models being used for all decoding branches, the one or more intermediate probability models taking into account frequencies of occurrence of the symbols in the respective image region and, when the respective image region is being encoded, frequencies for the respective set of one or more intermediate probability models being adapted based on the symbols occurring in the respective image region, each respective set of the one or more intermediate probability models being determined based on a common set of probability models that is applicable to all of the decoding branches, the common set of probability models taking into account frequencies of occurrence of the symbols in all of the image regions; and
      update the common set of probability models at predefined intervals of time based on frequencies adapted in at least one temporally preceding encoding cycle.

19. The device according to claim 18, further comprising a processor to:
   subdivide the images into image regions each having symbols;
   process the image regions in encoding cycles in such a way that within each encoding cycle, a plurality of image regions are processed in parallel in respective parallel encoding branches, whereby within each encoding branch, symbols of the respective image region are encoded using a respective entropy encoding, the respective entropy encoding being based on a set of one or more intermediate probability models, the common set of probability models being used for all encoding branches, the one or more intermediate probability models taking into account frequencies of occurrence of the symbols in the respective image region and, when the respective image region is being encoded, frequencies for the respective set of one or more intermediate probability models being adapted based on the symbols occurring in the respective image region, each respective set of the one or more intermediate probability models being determined based on a common set of probability models taking into account frequencies of occurrence of the symbols in all of the image regions; and update the common set of probability models at predefined intervals of time based on frequencies adapted in at least one temporally preceding encoding cycle, wherein the device acts as a codec for encoding and decoding symbols from a sequence of digitized images.

* * * * *